(12) United States Patent
Andersen et al.

(10) Patent No.: US 10,208,445 B2
(45) Date of Patent: Feb. 19, 2019

(54) DAM FOR SHIELDING WATER

(71) Applicant: COLD FLOOD PREVENTION APS, Hirtshals (DK)

(72) Inventors: Christian Rohde Andersen, Vintrie (SE); Allan Sørensen, Copenhagen S (DK)

(73) Assignee: COLD FLOOD PREVENTION APS, Hirtshals (DK)

( * ) Notice: Subject to any disclaimer, the term of this patent is extended or adjusted under 35 U.S.C. 154(b) by 0 days.

(21) Appl. No.: 15/118,653

(22) PCT Filed: Feb. 11, 2015

(86) PCT No.: PCT/DK2015/050031
§ 371 (c)(1),
(2) Date: Aug. 12, 2016

(87) PCT Pub. No.: WO2015/120860
PCT Pub. Date: Aug. 20, 2015

(65) Prior Publication Data
US 2017/0051464 A1      Feb. 23, 2017

(30) Foreign Application Priority Data
Feb. 14, 2014   (DK) .................................. 2014 70074

(51) Int. Cl.
*E02B 3/10*       (2006.01)
(52) U.S. Cl.
CPC ............... *E02B 3/108* (2013.01); *Y02A 10/13* (2018.01)

(58) Field of Classification Search
CPC .................................. E02B 3/106; E02B 3/108
See application file for complete search history.

(56) References Cited

U.S. PATENT DOCUMENTS 4,555,201 A * 11/1985 Paoluccio ............... E02B 3/108
                                                            405/117
5,040,919 A    8/1991 Hendrix
5,059,065 A    10/1991 Doolaege
(Continued)

FOREIGN PATENT DOCUMENTS

DE    102008026647 A1    4/2010
DE    102008026647 B4    6/2014
(Continued)

OTHER PUBLICATIONS

International Search Report for International Application No. PCT/DK2015/050031, dated Jun. 3, 2015, 4 pages.
(Continued)

*Primary Examiner* — Benjamin F Fiorello
(74) *Attorney, Agent, or Firm* — Michael Best & Friedrich LLP

(57) ABSTRACT

A dam (1) for shielding against water, said dam comprising at least one elongate section (10), each section comprising a section bottom (2), a section top (3) and two longitudinal side faces (4) and two end faces (5) together defining a volume (6), said at least one section (10) comprising one or more openings (11, 12) configured for filling and emptying of liquid to the volume (6), said at least one end face (5) comprising a collar (7) extending in the width along the periphery of the end face in extension of the bottom section and the two longitudinal side faces.

9 Claims, 8 Drawing Sheets

(56) References Cited

U.S. PATENT DOCUMENTS

Figure 1:
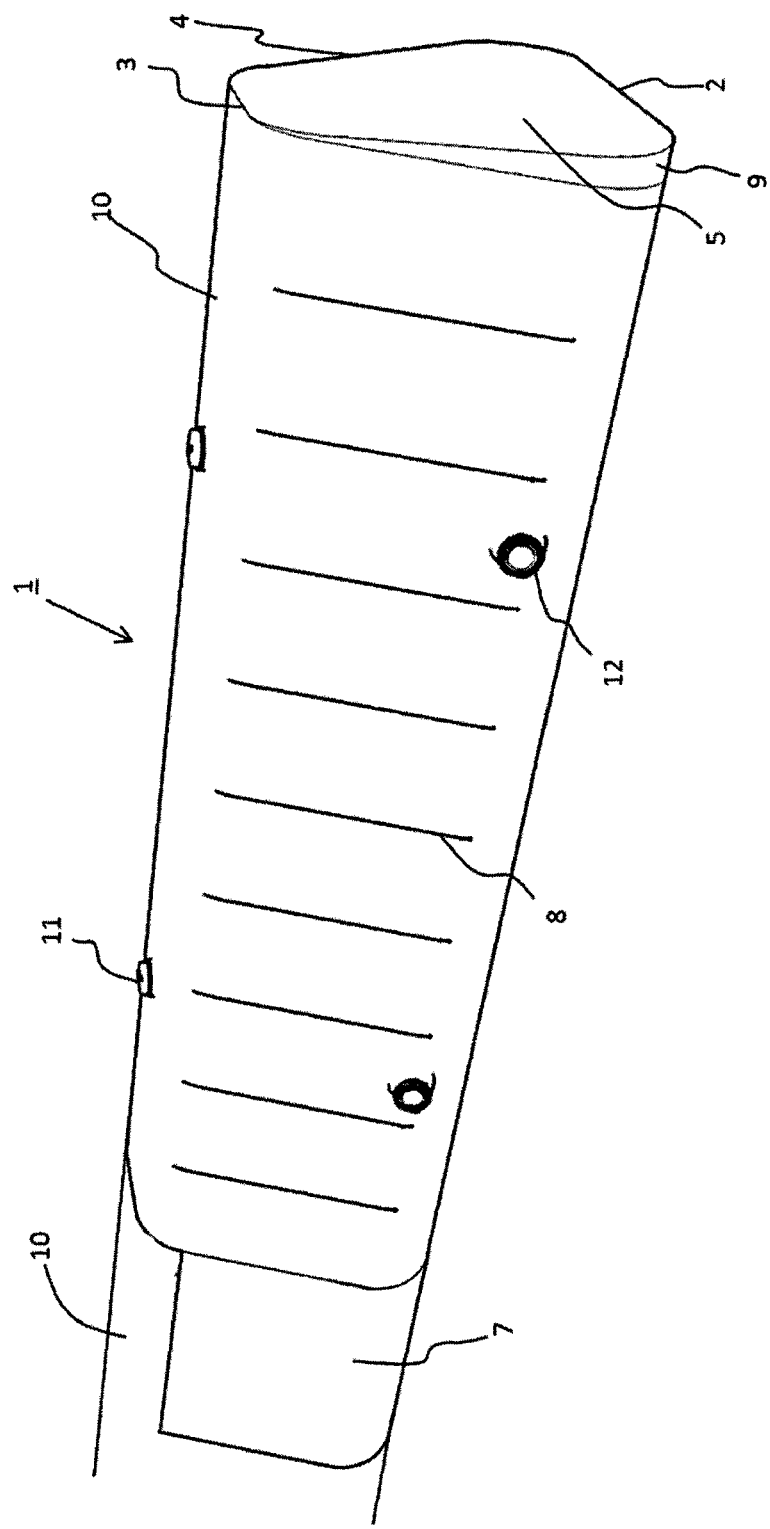

| | | | |
|---|---|---|---|
| 5,865,564 A | 2/1999 | Miller et al. | |
| 5,971,661 A * | 10/1999 | Johnson | E02B 3/108 405/107 |
| 6,126,362 A * | 10/2000 | Carter | E02B 3/108 405/114 |
| 6,164,870 A * | 12/2000 | Baruh | E02B 3/108 405/114 |
| 6,296,420 B1 | 10/2001 | Garbiso | |
| 6,334,736 B1 * | 1/2002 | Johnson | E02B 3/108 405/107 |
| 6,641,329 B1 * | 11/2003 | Clement | E02B 3/108 405/115 |
| 9,260,830 B2 * | 2/2016 | Schneider | E02B 3/108 |
| 2002/0110424 A1 * | 8/2002 | Page | E02B 3/108 405/115 |
| 2007/0154264 A1 * | 7/2007 | Baruh | E02B 3/108 405/110 |
| 2009/0208288 A1 * | 8/2009 | Stephens | E02B 3/127 405/45 |
| 2011/0318104 A1 | 12/2011 | Peterson et al. | |
| 2012/0207406 A1 * | 8/2012 | Cavenagh | E02B 3/108 383/38 |
| 2013/0094905 A1 | 4/2013 | Schnaars, Sr. et al. | |
| 2014/0226918 A1 * | 8/2014 | Adams | E02D 29/02 383/1 |

FOREIGN PATENT DOCUMENTS

| | | |
|---|---|---|
| EP | 2532789 A1 | 12/2012 |
| WO | 9804781 A1 | 2/1998 |
| WO | 0171100 A1 | 9/2001 |
| WO | 2013117229 A1 | 8/2013 |
| WO | 2014059427 A1 | 4/2014 |

OTHER PUBLICATIONS

Written Opinion of the International Searching Authority for International Application No. PCT/DK2015/050031, dated Jun. 3, 2015, 6 pages.

Third Party Observations for International Application No. PCT/DK2015/050031, dated May 4, 2016, 4 pages.

* cited by examiner

DAM FOR SHIELDING WATER

CROSS-REFERENCE TO RELATED APPLICATIONS

This is a U.S. national stage entry of International Patent Application No. PCT/DK2015/050031, filed on Feb. 11, 2015, which claims priority to Denmark Patent Application No. PA 2014 70074, filed on Feb. 14, 2014, the entire contents of all of which are fully incorporated herein by reference.

The present invention describes a dam for the shielding of water, said dam comprising at least one elongate section, each section comprising a section bottom, a section top and two longitudinal side faces and two end faces together defining a volume, said at least one section comprising one or more openings configured for filling and emptying of liquid to the volume.

BACKGROUND

Flooding occurs all over the world and it is well-known to use sandbags in order to prevent water damages, but this method has several drawbacks. Partly because building of dams with sandbags take a long time and require many hands, and of course sand must be available. Attempts have been made to address these drawbacks by using mobile dams, as described in WO017110 and U.S. Pat. No. 5,040,919. Here, elongate flexible sections are used which are filled with water and thus form a barrier against flooding.

In connection with damming of water it is particularly challenging to secure that the dams, which consist of several sub-elements/-sections, regardless of terrain conditions and other factors, effectively manage to dam the water without the occurrence of even small penetrations of water past the dam, for example where two dam sections are joined together end-by-end.

SHORT DESCRIPTION OF THE INVENTION

The object of the invention is to provide a re-usable mobile dam which reduces the risk of penetration of shielded water.

This is achieved in that at least one end face comprises a collar extending in the width along the periphery of the end face in extension of the end bottom section and the two longitudinal side faces.

Hereby is obtained a dam which may be extended with adjoining sections and at the same time reduces the risk of penetrating water.

In an embodiment according to the invention the collar extends at a length from the end face corresponding to the height of the side faces of the collar.

In an embodiment according to the invention the collar extends at a length of 1 meter from the end face.

In an embodiment according to the invention the length of the section bottom in the at least one end of the section extends beyond the length of the section top whereby the end face is inclined. Thereby it is easier to achieve a tighter joint between the two adjoining sections. This aspect can work independently and may be exercised independently of the technical features mentioned in the characterizing part of claim 1.

In an embodiment according to the invention the length of the section bottom is 5-50 cm longer than the section top, preferably approx. 20 cm.

In an embodiment according to the invention the section is subdivided into sub-sections extending longitudinally perpendicular to each other where the two sub-sections are connected, whereby the section comprises a 90 degree bend.

In an embodiment according to the invention the section is subdivided into two subsections extending longitudinally at an acute angle relative to each other where the two sub-sections are connected, whereby the section comprises a bend having an obtuse angle. This aspect can work independently and may be exercised independently of the technical features mentioned in the characterizing part of claim 1.

In an embodiment according to the invention the section moreover comprises an intermediate section, said intermediate section extending between the two sub-sections where the angle between the extensions of the two sub-sections is distributed between the two angles, namely two angles between the extension of the sub-section and the intermediate section and the angle between the intermediate section and the extension of the sub-section, respectively. Thereby is achieved that the water pressure during operation of the dam will strain the individual section parts less.

In an embodiment according to the invention one end face comprises a collar and the other end face comprises an inclined end face where the length of the bottom face is larger than the length of the top face.

An embodiment according to the invention describes the dam according to one or more of the preceding claims, where the collar comprises one or more fastening straps, said one or more fastening straps being arranged such that the one or more fastening straps and the collar can enclose the end of an adjoining section such that the side faces of the collar are fixed along the side faces of the adjoining section. It is thereby achieved that the free ends of the collar may be fixed along the side faces of the adjoining section.

In an embodiment of the invention at least two sections comprise one or more complementarily shaped clamping means positioned at the bottom of the one or the other end of a section, respectively, such that the two adjoining elements comprise complementary clamping means for coupling.

FIGURES

Figure 2:
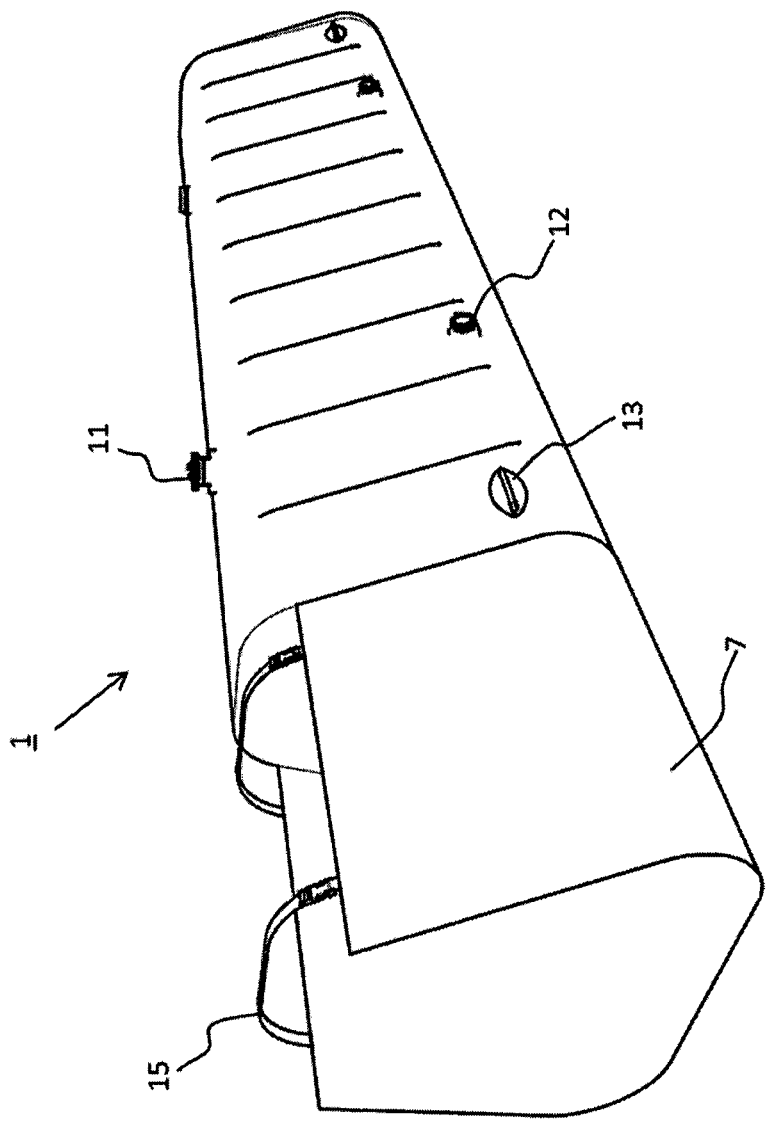
Figure 3:
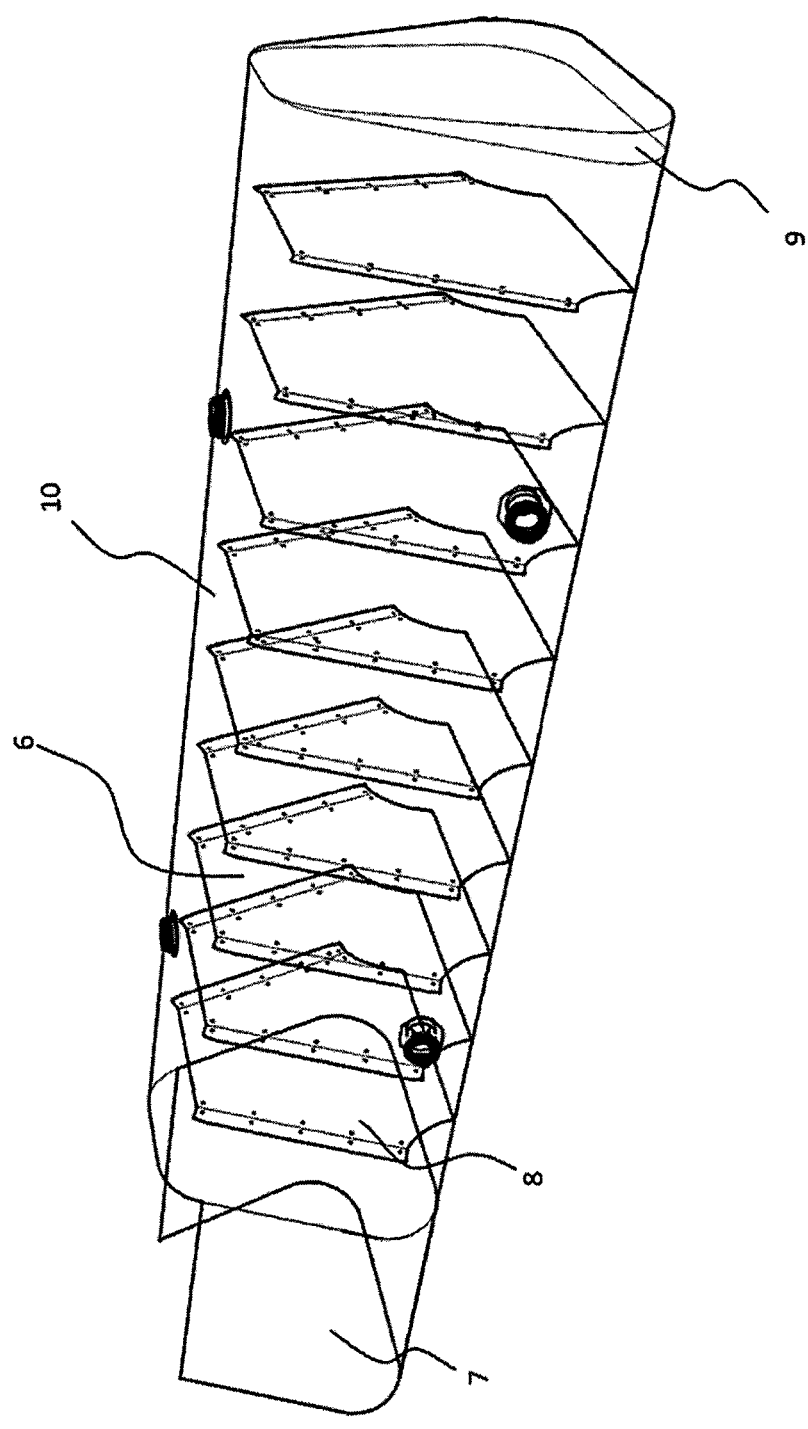
Figure 4:
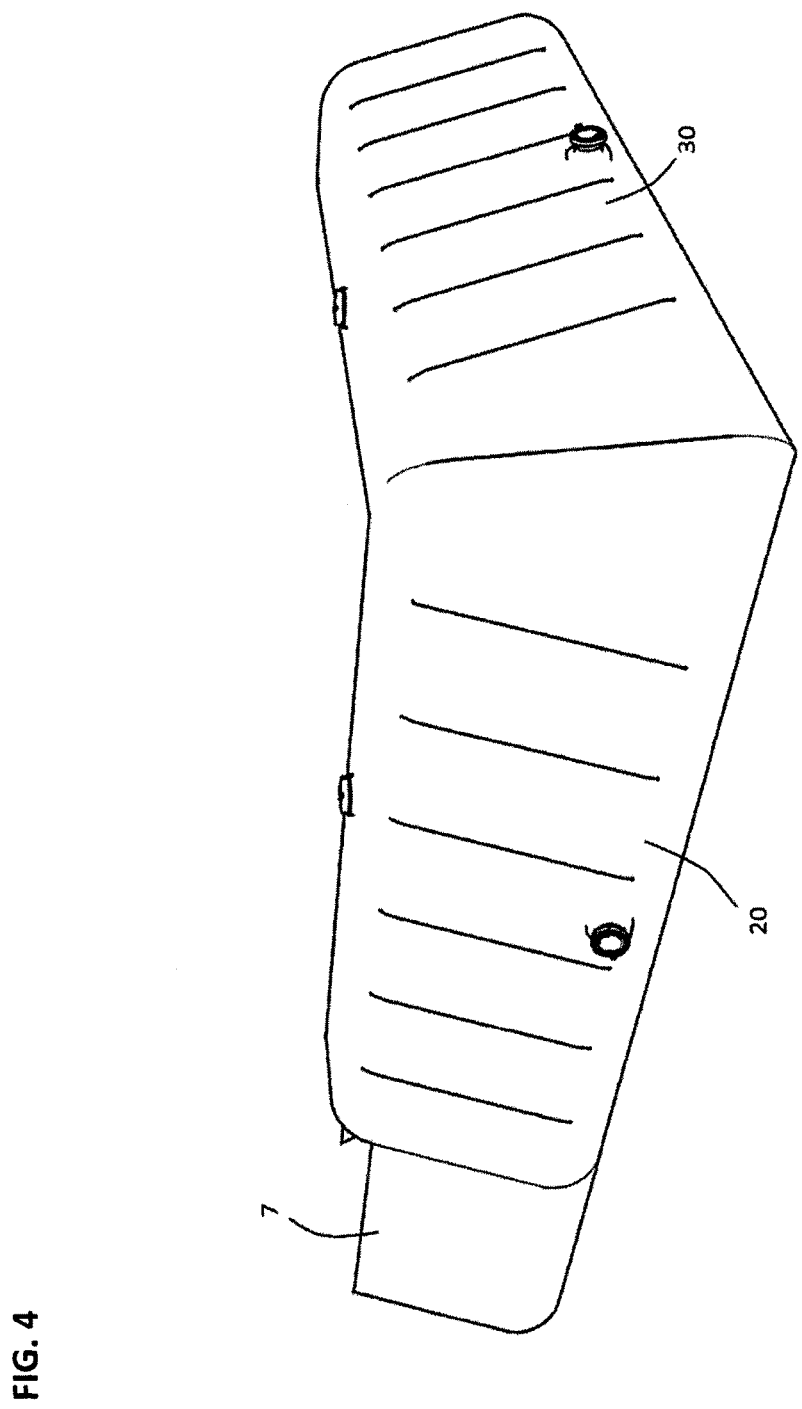
Figure 5:
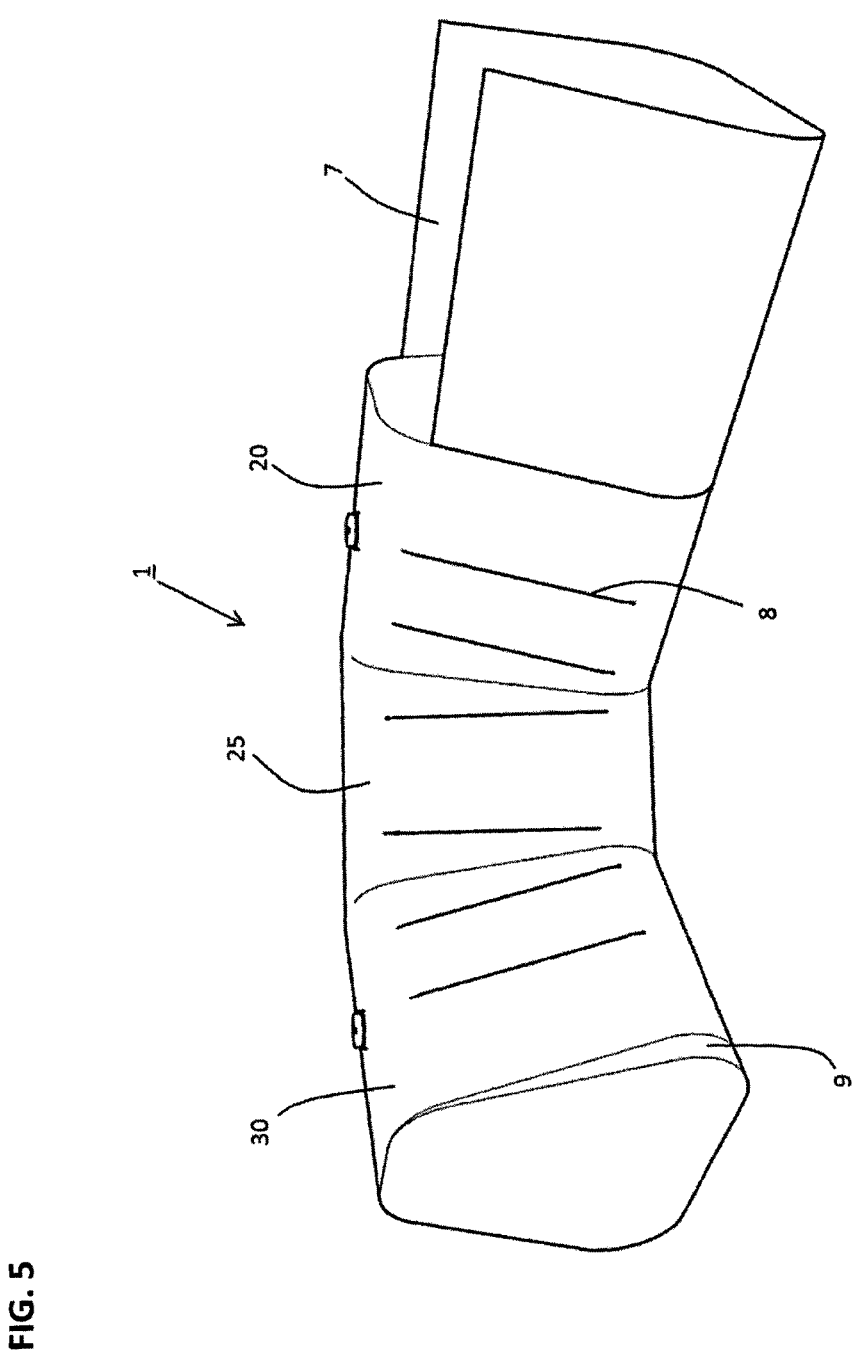
Figure 6:
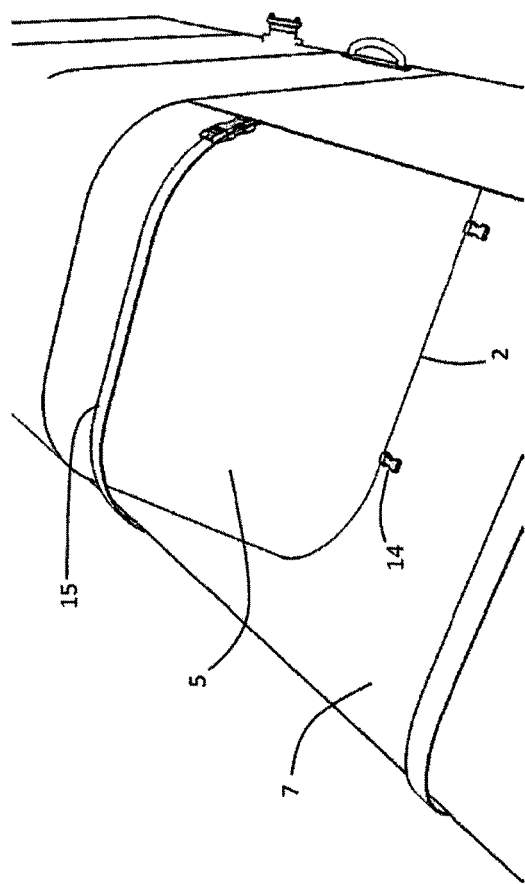
Figure 7:
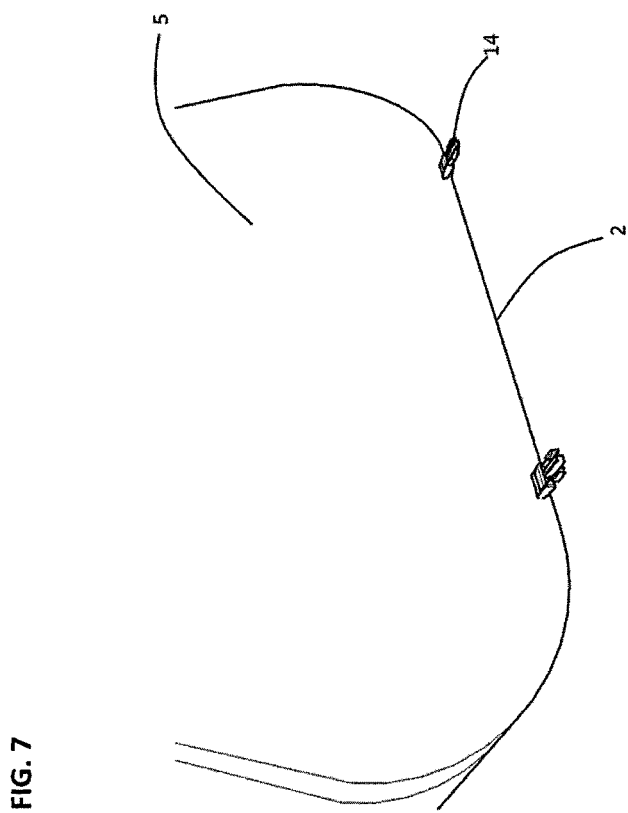
Figure 8:
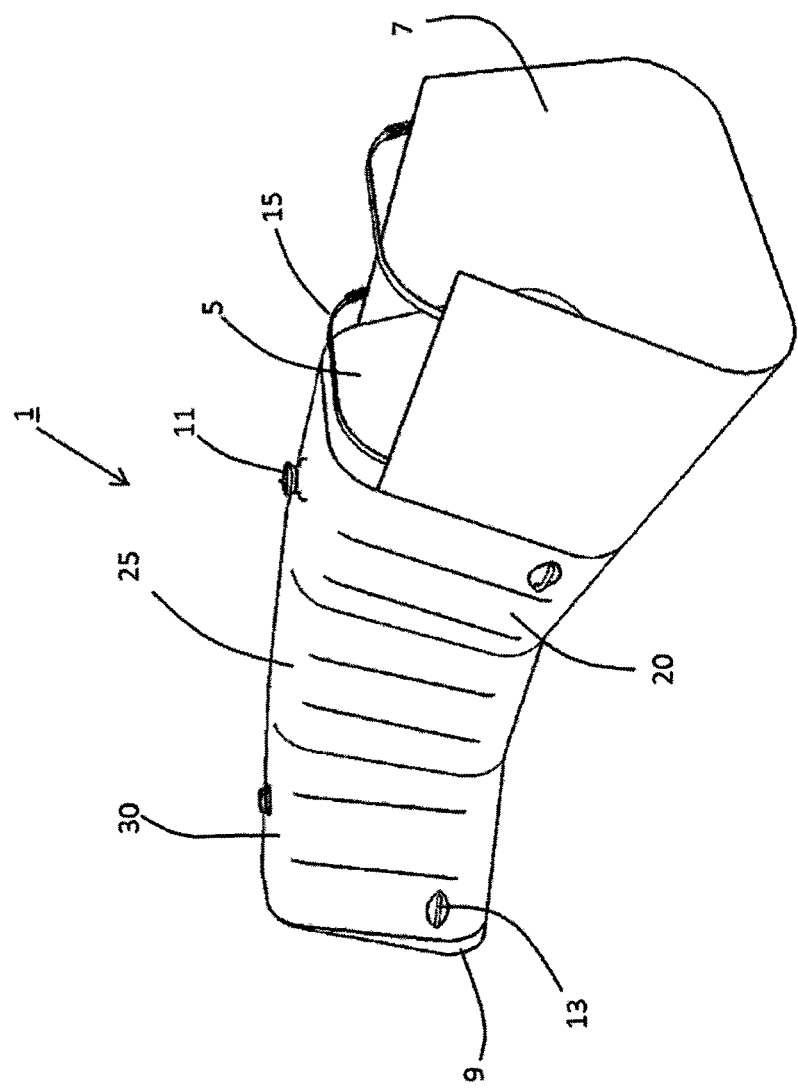

An embodiment according to the invention will be explained in more detail with reference to the drawing in which FIG. 1 shows a perspective view of a dam according to the invention, FIG. 2 shows a perspective view of an elongate straight dam section, FIG. 3 shows a perspective view of a section having inner support structures, FIG. 4 shows a perspective view of a corner section with a 90 degree bend, FIG. 5 shows a perspective view of a section with a 135 degree bend, FIG. 6 shows the end of a section having collar and clamping means, FIG. 7 shows the other end of a section having complementary clamping means, FIG. 8 shows a perspective view of a section with a 135 degree bend.

DETAILED DESCRIPTION WITH REFERENCE TO THE FIGURES

As shown in FIG. 1, the present invention describes a mobile dam 1 which can shield water and thus prevent flooding.

The dam (1) comprises one or more elongate sections (10), each section comprising a section bottom (2), a section top (3) and two longitudinal side faces (4) and two end faces (5) together forming a volume (6).

The section (10) shown in FIG. 1 comprises one or more coupling means and valves (11,12) such that the volume of a section can be filled with water and emptied by connecting a pipe and/or a pump.

The section (10) comprises an end face (5) comprising a collar (7) extending in the width along the periphery of the end face and extending longitudinally from the end face in extension of the bottom section and the two longitudinal side faces. The collar thus forms a U-shape where an adjoining section (10) adjacent to the end face in the following section with the U-shaped collar will partially enclose the adjacent section.

The collar (7) extends at a length from the end face corresponding to the height of the side faces of the collar or beyond the height of the side faces of the collar measured from the plane face. The length of the collar is approx. 0.5-1.5 m long.

In an embodiment according to the invention the collar (7) extends at a length of 1 m from the end face (6).

In order to increase the density between the two adjoining dam sections, one end face is provided with additional material at the bottom in order for the section to reduce the formation of void due to the natural rounding of two sections arranged next to each other. The length of the section bottom (2) extends beyond the length of the section top (3) such that the end face is inclined.

The end face (5) forms an obtuse angle with the plane top face (3) and an acute angle with the plane section bottom (2). The length of the section bottom is 5-50 cm longer than the section top, approx. 20 cm.

FIG. 1 shows a section where one end face comprises a collar (7) and the other end face comprises an inclined end face (9). The figure moreover shows an adjoining section (10) where one end face has been enclosed by the collar (7) of the first section.

FIG. 2 shows an elongate dam section (10) where the collar (7) comprises two fastening straps (15) in the form of straps with snap buckles. The fastening straps are arranged such that the two fastening straps and the collar (7) can enclose the end of an adjacent section such that the side faces are held along the side faces of the adjoining section. The elongate straight section comprises a filling valve (11) and a discharge valve (12).

FIG. 3 shows an elongate straight section comprising inner support structures (8) arranged in the inner volume (6) of the section. The support structures are arranged at regular intervals through the entire section in order to stabilize the construction so that it can withstand the water pressure from one of the longitudinal sides of the dam. The one end of the section comprises a collar (7) and the other end comprises an inclined end face (9).

The section may be provided with various forms of cross-sections, such as triangular-shaped. In a preferred embodiment of the invention, the cross-section is trapezoidal, as shown in the figures.

In order to make a section resistant to pressures of water or wind, the section is preferably formed with a trapezoidal cross-section, where the section bottom (2) and the section top (3) have different sizes, whereas the section bottom (2) and the side faces (4) have almost identical lengths.

FIG. 4 shows a dam having a 90 degree bend. The section is subdivided into two subsections (20, 30) extending longitudinally perpendicular relative to each other where the two sections are joined such that the section (10) forms a 90 degree bend.

The section (10) may be provided with an obtuse angle, such as a 135 degree bend, whereby the section is subdivided into two sub-sections (20, 30) extending longitudinally at an acute angle, such as a 45 degree angle relative to each other, whereby the section (10) forms a 135 degree bend. The section comprises a collar (7) in one end of the section.

FIG. 5 shows a dam (1) having a bend with an obtuse angle. This embodiment comprises an intermediate section (25), the intermediate section extending between the two sub-sections (20, 30), the angle between the extension of the two sub-sections (20, 30) being distributed between the two angles formed between the angle between the extension of the sub-section (20) and the intermediate section (25), and the angle between the intermediate section (25) and the extension of the sub-section (30), respectively. This bend is thus more rounded in its shape and the strain of the water pressure under use on the individual section elements will be reduced. The obtuse angle may be 135 degrees, such that the two sections having a 135 degree bend together will form a rounded 90 degree bend.

The section comprises a collar (7) at one end and an inclined end face (9) at the opposite end of the section. The inner structures (8) have been fastened to the inside of the side faces of the plane face.

FIGS. 6 and 7 show that the sections can comprise one or more complementarily formed clamping means (14) positioned at the section bottom (2) in one and the other end faces (5), respectively, of the adjoining sections such that the two adjoining elements comprise complementary clamping means for coupling. In FIGS. 6 and 7, the complementary clamping means (14) are shown as well-known snap buckles. These clamping means are primarily used in connection with the setting-up in order to more easily position the adjoining section relative to each other. This means that the clamping force of the clamping means allows easy release at higher shear forces between the two adjoining sections in order to avoid them being torn apart where the clamping means are mounted. The collar (7) comprises two clamping means (15).

FIG. 8 shows a section with a 135 degree bend, the intermediate section (25) extending between the two sub-sections (20, 30), the angle between the extension of the two sub-sections (20, 30) being distributed between the two angles formed between the angle between the extension of the sub-section (20) and the intermediate section (25) and the angle between the intermediate section (25) and the extension of the subsection (30), respectively. This 135 degree bend is thus more rounded in its shape than the 135 degree bend mentioned above. By coupling the two sections which correspond to the section shown in FIG. 8, a rounded 90 degree bend occurs where the bend is distributed over four angles.

It is thus possible to achieve a sharp 90 degree bend, as shown in FIG. 4, or a soft rounded 90 degree bend, by joining the two sections with 135 degree bends comprising an intermediate section (25), as shown in FIG. 8.

FIG. 8 shows the U-shaped collar (7) extending along the edge of the end face (5) along the two side faces and the section bottom.

The collar (7) is thus an extension of the section bottom and fully or partially of the side faces of the section. The collar comprises two fastening straps (15) which as shown comprise well-known snap buckles for easy retention of the side faces of the collar along an adjoining section.

The section is provided with grips (13) for easy handling of the setting-up of the dam sections.

The collar (7) may be formed a little larger than corresponding to a direct extension of the side faces and the section bottom in order for the collar to enclose an adjoining section. At the opposite end, the section comprises an inclined end face (9).

In an embodiment, a straight elongate section having a trapezoidal cross-section has the following dimensions: length 6 m, width of the section bottom 1 m, height 1 m and section top 0.6 m wide. The collar (7) is 1 m such that the section including the collar is a total of 7 m long. The inner structures (8) are spaced 0.5 m apart.

An example of another embodiment of a section is for example shown in FIG. 1, where the section has rounded edges such that the plane section bottom is 0.71 m wide, and the widest part of the bottom over the rounded edge is 1.15 m wide. The section top (2) measures, on the plane narrow elongate piece, 0.27 m in the width and after the rounding the section top is 0.63 m wide.

The total length of the section is 4 m long such that the area of the plane section bottom is 4×0.7 m, and the face area of the plane section top is 0.27×4 m.

The shape of the two end faces (5) are preferably trapezoidal with a bottom length of 0.7 m and a parallel top length of 0.27 m, and a distance between the two bottom and top planes is 1.04 m.

The collar is 1 m long such that the total length of the section is 5 m, and it extends upwardly along the side faces (4,5) and ends before the rounding against the plane top.

The U-shaped collar follows the periphery of the end face corresponding to the form of the cross-section of the adjoining section.

The inner support structures (8) shown in FIG. 3 are spaced approx. 0.4 m apart in order to stabilize the dam such that it can withstand the water pressure from one of the longitudinal sides of the dam.

The dam is made of light and strong materials such as strong plastic or rubber material, preferably having a weight of 3.8 kg/m, corresponding to 38 kg pr. 10 m.

The invention claimed is:

1. A dam (1) for the shielding of water, the dam comprising at least one elongate section (10), each section comprising a section bottom (2), a section top (3) and two longitudinal side faces (4) and two end faces (5) together defining a volume (6), the at least one section (10) comprising one or more openings (11, 12) configured for filling and emptying of liquid to the volume (6), characterized in that one end face (5) comprises a collar (7) extending in the width along the periphery of the end face in extension of the bottom section and the two longitudinal side faces, and further characterized in that the length of the section bottom (2) in the other end face (5) of the section extends beyond the length of the section top (3), whereby the end face (5) is inclined, this being achieved by the section bottom (2) having a length, beyond the length of the section top (3), corresponding to between 5% and 50% of the height between the section bottom (2) and the section top (3).

2. A dam according to claim 1, where the collar (7) extends longitudinally from the end face corresponding to the height of the side faces of the collar.

3. A dam according to one or more of the preceding claims, where the collar (7) extends at a length of 1 m from the end face (5).

4. A dam according to claim 1, where the section (10) is subdivided into two sub-sections (20, 30) extending longitudinally perpendicular relative to each other where the two sub-sections are joined whereby the section (10) comprises a 90 degree bend.

5. A dam according to claim 1, where the section (10) is subdivided into two sub-sections (20, 30) extending longitudinally at an acute angle relative to each other where the two sub-sections are joined whereby the section (10) comprises a bend having an obtuse angle.

6. A dam according to claim 4 or 5, where the section (10) furthermore comprises an intermediate section (25), the intermediate section extending between the two sub-sections (20, 30), the angle between the extension of the two sub-sections (20, 30) being distributed between two angles, the two angles being between the extension of the sub-section (20) and the intermediate section (25) and the angle between the intermediate section (25) and the extension of the sub-section (30), respectively.

7. A dam according to claim 1 or claim 2, where the collar (7) comprises one or more fastening straps (15), where the one or more fastening straps are arranged such that the one or more fastening straps and the collar (7) can enclose the end of an adjoining section such that the side faces of the collar are fixed along the side faces of the adjoining section.

8. A dam according to claim 1 or claim 2, where at least two sections comprise one or more complementarily provided clamping means (14) positioned at the bottom of the one and the other end of a section (1), respectively, such that two adjoining elements comprise complementary clamping means for coupling.

9. Two adjoining dam sections, where each section comprises a dam (1) for the shielding of water, the dams each comprising at least one elongate section (10), each section comprising a section bottom (2), a section top (3) and two longitudinal side faces (4) and two end faces (5) together defining a volume (6), the at least one section (10) comprising one or more openings (11, 12) configured for filling and emptying of liquid to the volume (6), characterized in that the at least one end face (5) at a junction of the two adjoining dam sections comprises a collar (7) extending in the width along the periphery of the end face in extension of the bottom section thereof and the two longitudinal side faces, and further characterized in that the end face (5) of the other dam section at the junction of the two adjoining dam sections has a length of the section bottom (2) which extends beyond the length of the section top (3) whereby this end face (5) is inclined.

* * * * *